United States Patent
Jones et al.

(10) Patent No.: US 10,210,476 B2
(45) Date of Patent: *Feb. 19, 2019

(54) OUT OF STOCK ITEM TRACKING AT RETAIL SALES FACILITIES

(71) Applicant: Walmart Apollo, LLC, Bentonville, AR (US)

(72) Inventors: Nicholaus A. Jones, Fayetteville, AR (US); Robert J. Taylor, Rogers, AR (US); Matthew A. Jones, Bentonville, AR (US)

(73) Assignee: Walmart Apollo, LLC, Bentonville, AR (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/875,760

(22) Filed: Jan. 19, 2018

(65) Prior Publication Data

US 2018/0144294 A1    May 24, 2018

Related U.S. Application Data

(63) Continuation of application No. 15/202,897, filed on Jul. 6, 2016, now Pat. No. 9,911,097.

(60) Provisional application No. 62/200,431, filed on Aug. 3, 2015.

(51) Int. Cl.
*G06Q 10/08* (2012.01)

(52) U.S. Cl.
CPC .................. *G06Q 10/087* (2013.01)

(58) Field of Classification Search
CPC ............... G06Q 10/087; G06K 7/01
See application file for complete search history.

(56) References Cited

U.S. PATENT DOCUMENTS

| | | | |
|---|---|---|---|
| 6,681,990 B2 | 1/2004 | Vogler | |
| 8,321,302 B2 | 11/2012 | Bauer | |
| 8,521,620 B2 | 8/2013 | Livingston | |
| 8,626,614 B2 | 1/2014 | Barber | |
| 2003/0233277 A1 | 12/2003 | Saunders | |
| 2005/0131578 A1 | 6/2005 | Weaver | |

(Continued)

OTHER PUBLICATIONS

DeAngelis, Stephen F.; "In Stock, Out of Stock, and On-Shelf Availability," Enterra Insights Blog; Apr. 25, 2013; http://www.enterrasolutions.com/2013/04/in-stock-out-of-stock-and-on-shelf-availability.html; pp. 1-13.

(Continued)

*Primary Examiner* — Christle I Marshall
*Assistant Examiner* — Asifa Habib
(74) *Attorney, Agent, or Firm* — Fitch, Even, Tabin & Flannery LLP

(57) ABSTRACT

In some embodiments, methods and systems of locating overstock items at a retail sales facility include receiving an indication that a product at the retail sales facility is out of stock and determining whether the product is located on a sales floor or in the stock room at the retail sales facility; then, in response to a determination that the product is not located on the sales floor or in the stock room, tracking a location of the product based on at least one inventory management factor associated with the retail sales facility and at least one worker task event associated with the product; and outputting to a worker at the retail sales facility, based on the tracking of the location of the at least one product, an indication of a perceived location of the least one product.

14 Claims, 4 Drawing Sheets

(56) References Cited

U.S. PATENT DOCUMENTS

| | | |
|---|---|---|
| 2005/0149414 A1 | 7/2005 | Schrodt |
| 2006/0195370 A1 | 8/2006 | Howarth |
| 2008/0255968 A1 | 10/2008 | Heinrichs |
| 2009/0248198 A1 | 10/2009 | Siegel |
| 2010/0138281 A1 | 6/2010 | Zhang |
| 2014/0100769 A1 | 4/2014 | Wurman |
| 2014/0143039 A1 | 5/2014 | Branton |
| 2014/0222601 A1 | 8/2014 | Soldate |
| 2016/0171432 A1 | 6/2016 | Pugh |
| 2016/0260161 A1 | 9/2016 | Atchley |
| 2016/0350787 A1 | 12/2016 | Taylor |

OTHER PUBLICATIONS

Gruen, Thomas W., et al.; "A Comprehensive Guide to Retail Out-of-Stock Reduction in the Fast-Moving Consumer Goods Industry"; 2007; 67 pages.

U.S. Appl. No. 15/202,897; Notice of Allowance dated Oct. 19, 2017.

U.S. Appl. No. 15/202,897; Office Action dated Feb. 21, 2017.

OUT OF STOCK ITEM TRACKING AT RETAIL SALES FACILITIES

CROSS-REFERENCE TO RELATED APPLICATION

This application is a continuation of U.S. application Ser. No. 15/202,897, filed Jul. 6, 2016, which claims the benefit of U.S. Provisional Application No. 62/200,431, filed Aug. 3, 2015, which are incorporated herein by reference in their entireties.

TECHNICAL FIELD

This invention relates generally to managing inventory at retail sales facilities and, in particular, to systems and methods for tracking out of stock items at retail sales facilities.

BACKGROUND

Retail sales facilities often permit consumers to determine whether a product offered for sale at the retail sales facility is in stock by scanning the product. Also, consumers often request sales associates and/or managers at the retail sales facility to check whether a product of interest is in stock at the retail sales facility. Having to perform a large number of scans for low inventory and/or out of stock items often takes up a large portion of time from department managers and/or sales associates at the retail sales facility.

When a product is determined to be out of stock at the retail sales facility via a scan by the consumer or sales or stocking associate, the consumer is typically informed either that the product is not available, or that the sales or stocking associate will go to the stock room to check whether the product indicated to be out of stock may be nevertheless present in the stock room. However, since the conventional inventory management systems do not provide the sales or stocking associate with possible locations where additional units of the product indicated to be out of stock may be present at the retail sales facility, the sales or stocking associates are often forced to physically check multiple locations at the retail sales facility to look for possible additional units of the out of stock product, which is time consuming and inefficient.

BRIEF DESCRIPTION OF THE DRAWINGS

Disclosed herein are embodiments of systems, apparatuses and methods pertaining to methods and systems for sorting overstock inventory. This description includes drawings, wherein.

Figure 1:
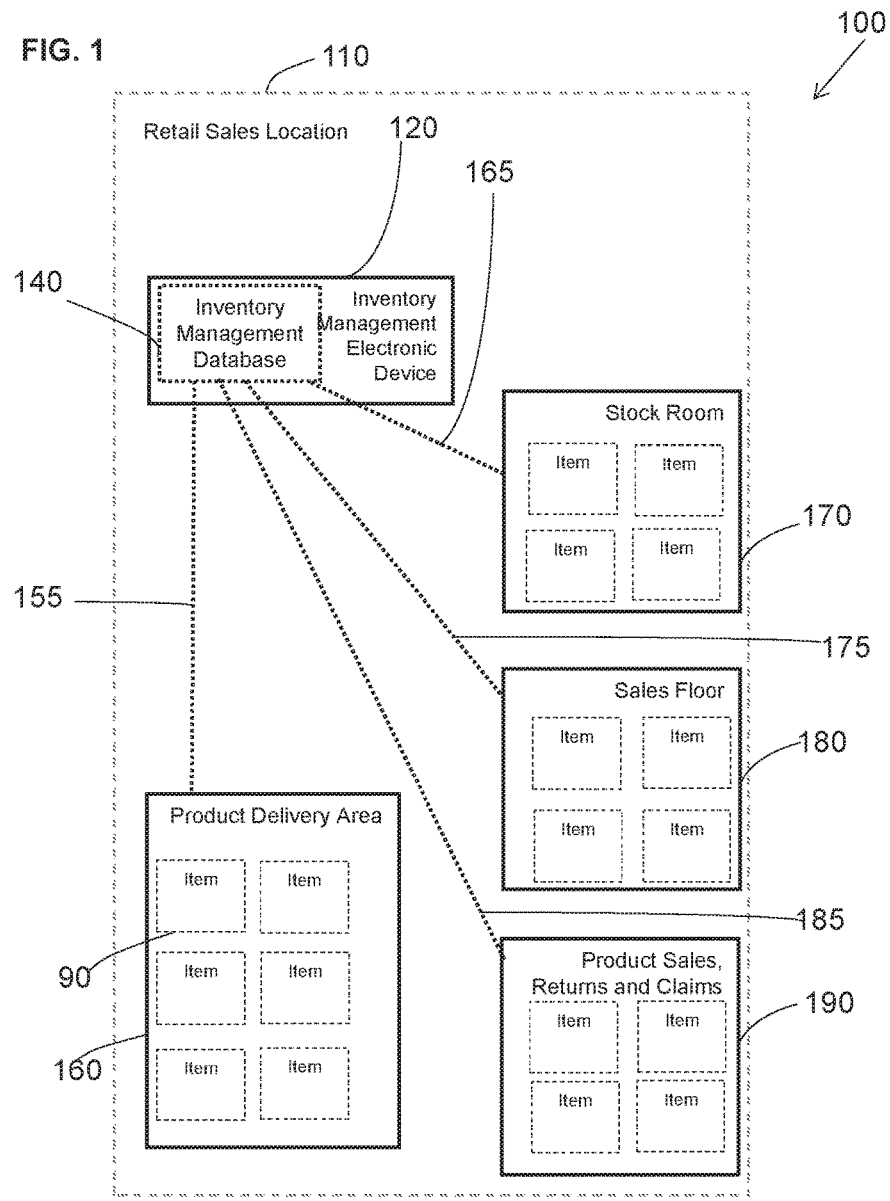
FIG. 1 is a diagram of a retail sales facility overstock tracking system in accordance with some embodiments.

Elements in the figures are illustrated for simplicity and clarity and have not necessarily been drawn to scale. For example, the dimensions and/or relative positioning of some of the elements in the figures may be exaggerated relative to other elements to help to improve understanding of various embodiments of the present invention. Also, common but well-understood elements that are useful or necessary in a commercially feasible embodiment are often not depicted in order to facilitate a less obstructed view of these various embodiments of the present invention. Certain actions and/or steps may be described or depicted in a particular order of occurrence while those skilled in the art will understand that such specificity with respect to sequence is not actually required. The terms and expressions used herein have the ordinary technical meaning as is accorded to such terms and expressions by persons skilled in the technical field as set forth above except where different specific meanings have otherwise been set forth herein.

DETAILED DESCRIPTION

Generally speaking, this application describes systems and methods for tracking out of stock items at retail sales facilities. In some embodiments, the systems and methods described herein include one or more electronic devices configured to receive an indication that a product at a retail sales facility is out of stock and determine a location of the product at the retail sales facility based on at least one inventory management factor associated with the retail sales facility and/or at least one worker task event associated with the at least one product.

In one embodiment, a method for assisting in the locating of out of stock items at a retail sales facility includes: receiving, an indication that at least one product at the retail sales facility is out of stock on a sales floor at the retail sales facility; determining, via an inventory management electronic device including a processor, that inventory management data indicates that the at least one product is not located on the sales floor and is not located in a stock room of the retail sales facility; tracking, via the inventory management electronic device, a location of the at least one product based on at least one inventory management factor associated with the retail sales facility and at least one worker task event associated with the at least one product; and outputting, based on the tracking step and via the inventory management electronic device, an indication of a predicted location of the least one product to a user at the retail sales facility.

A system for tracking out of stock items at a retail sales facility according to one embodiment includes at least one inventory management database including inventory management data regarding at least one product at the retail sales facility; and a control circuit including a processor in communication with the at least one inventory management database. The control circuit is configured to: receive inventory management data that indicates that the at least one product is not located on the sales floor and is not located in a stock room of the retail sales facility; track a location of the at least one product based on at least one inventory management factor associated with the retail sales facility and at least one worker task event associated with the at least one product; and output to a user at the retail sales facility, based on the tracking of the location of the at least one product, an indication of a predicted location of the least one product.

According to one embodiment, a system for tracking out of stock items at a retail sales facility includes at least one storage means including inventory management data regarding at least one product at the retail sales facility and a control means including a processor in communication with the at least one inventory management database. The control means is configured to: receive inventory management data that indicates that the at least one product is not located on the sales floor and is not located in a stock room of the retail sales facility; track a location of the at least one product based on at least one inventory management factor associated with the retail sales facility and at least one worker task event associated with the at least one product; and output to a user at the retail sales facility, based on the tracking of the location of the at least one product, an indication of a predicted location of the least one product.

Referring to FIG. 1, one embodiment of a system 100 for tracking and/or locating out of stock products at a retail sales facility 110 is shown. The retail sales facility 110 may be any place of business such as a store or warehouse where consumer products are stocked and/or sold. The system 100 includes an inventory management electronic device 120 configured to manage product inventory at the retail sales facility 110. The inventory management electronic device 120 illustrated in FIG. 1 may be a stationary, portable, or hand-held electronic device, for example, a desktop computer, a laptop computer, a tablet, a mobile phone, or any other electronic, processor-based device that may be configured for data entry and communication with another electronic, processor-based device located at the retail sales facility 110, or at a location remote to the retail sales facility 110 (e.g., a regional or central server configured for two-way communication with multiple retail sales facilities 110).

Figure 4:
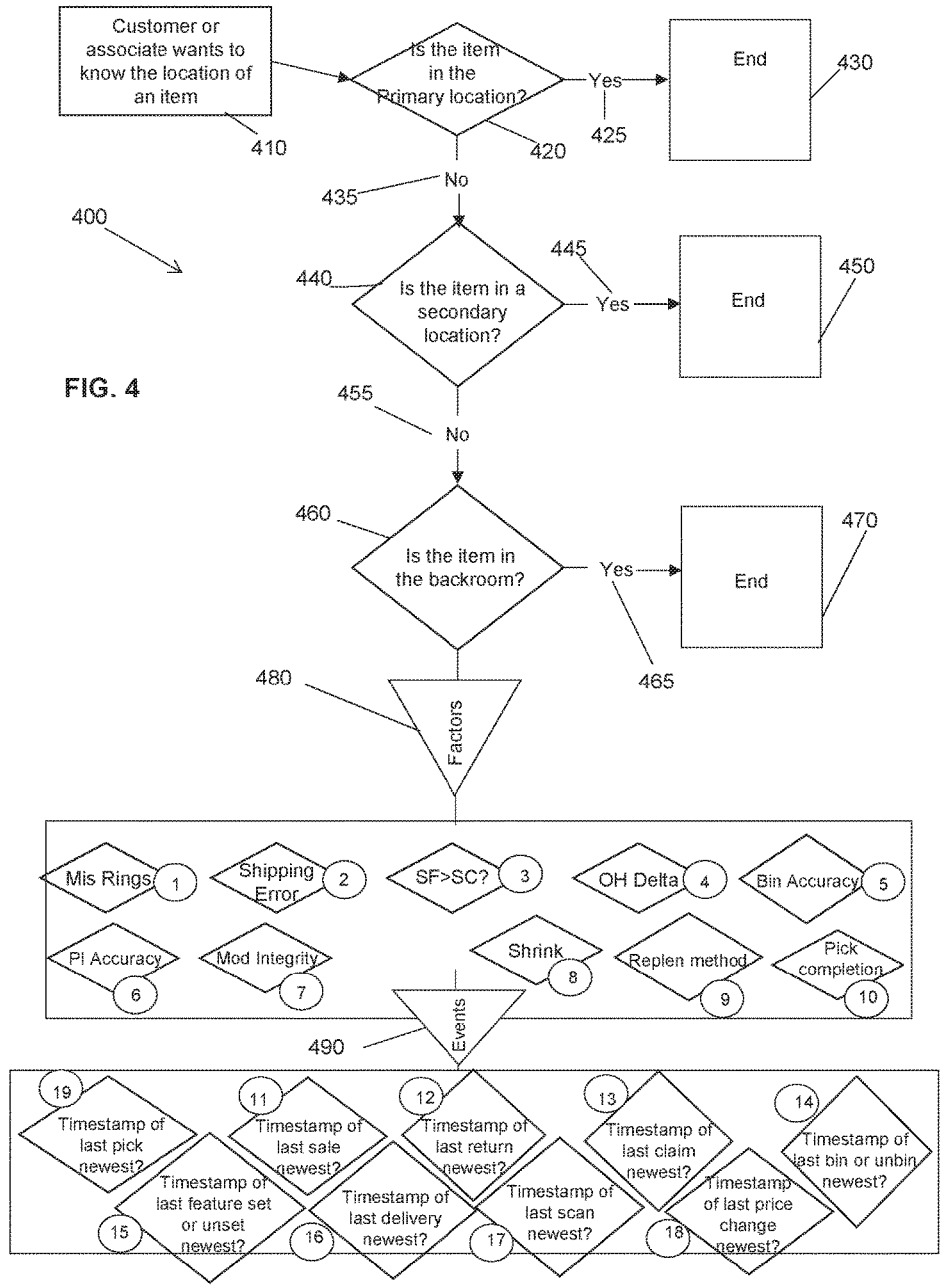
FIG. 4 is a flow chart diagram of a method of tracking out of stock products at a retail sales facility in accordance with several embodiments.

The exemplary inventory management electronic device 120 shown in FIG. 1 includes an inventory management database 140 configured to store information regarding the items 90 present at the retail sales facility 110. The inventory management database 140 may be stored, for example, on non-volatile storage media (e.g., a hard drive, flash drive, or removable optical disk) internal or external relative to the inventory management electronic device 120 or internal to computing devices (e.g., remote server) separate and distinct from the inventory management electronic device 120. The information regarding the items 90 stored on the inventory management database 140 may include various historical/statistical inventory management factors pertaining to the retail sales facility 110 and worker task events pertaining to the items 90, which are shown in FIG. 4, and will be discussed in more detail below.

FIG. 1 schematically shows (via dotted lines 155, 165, and 175) that the inventory management database 140 contains information regarding the items 90 present in the product delivery area 160, stock room 170, sales floor 180, and product sale/return/claim areas 190 of the retail sales facility 110, but it will be appreciated that the inventory management database 140 may contain information regarding any items 90 present in any other area of the retail sales facility 110 and may include information relating to tasks performed by workers in any other area of the retail sales facility 110 with respect to the items 90. The items 90 may be identified in the inventory management database 140 by way of stock keeping unit (SKU) numbers or any other unique identifiers. It will be appreciated that the inventory management database 140 does not have to be incorporated into the inventory management electronic device 120 local to the retail sales facility 110, but may be stored on a remote (e.g., central) server in communication with the inventory management electronic device 120.

Figure 2:
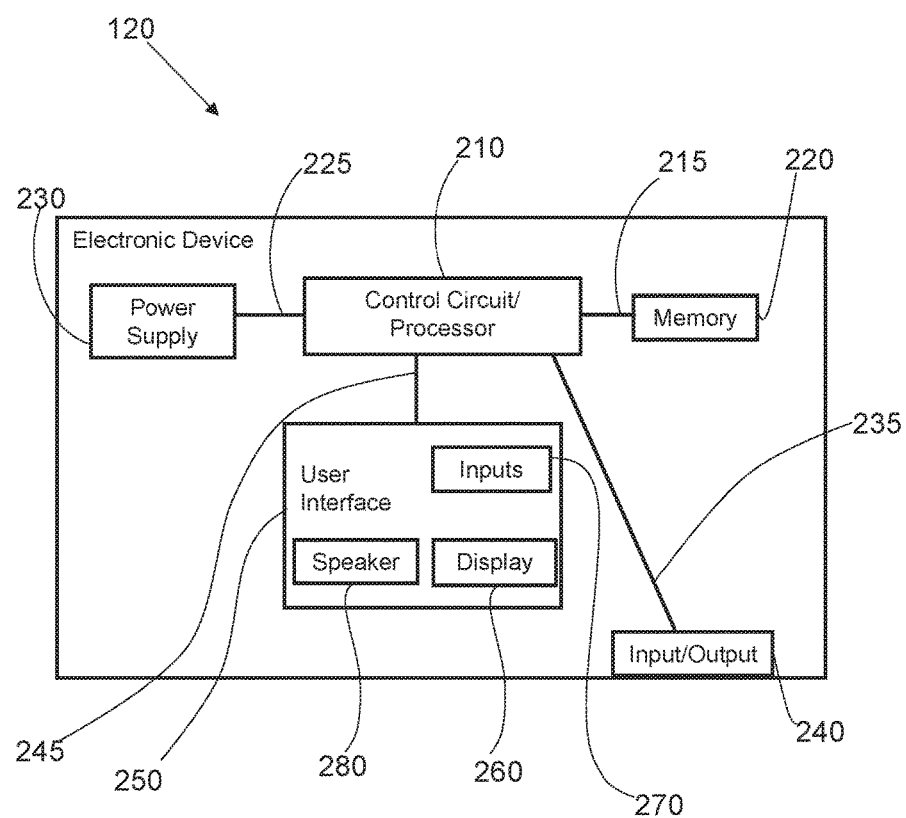
FIG. 2 is a functional diagram of an inventory management electronic device in accordance with several embodiments.

An exemplary inventory management electronic device 120 depicted in FIG. 2 is a computer-based device and includes a control circuit 210 including a processor (for example, a microprocessor or a microcontroller) electrically coupled via a connection 215 to a memory 220 and via a connection 225 to a power supply 230. The control circuit 210 can comprise a fixed-purpose hard-wired platform or can comprise a partially or wholly programmable platform, such as a microcontroller, an application specification integrated circuit, a field programmable gate array, and so on. These architectural options are well known and understood in the art and require no further description here. This control circuit 210 can be configured (for example, by using corresponding programming stored in the memory 220 as will be well understood by those skilled in the art) to carry out one or more of the steps, actions, and/or functions described herein. In some embodiments, the memory 220 may be integral to the control circuit 210 or can be physically discrete (in whole or in part) from the control circuit 210 and is a non-volatile data storage media such as a hard drive configured to store the inventory management database 140.

The memory 220 can be configured non-transitorily store the computer instructions that, when executed by the control circuit 210, cause the control circuit 210 to behave as described herein. (As used herein, this reference to "non-transitorily" will be understood to refer to a non-ephemeral state for the stored contents (and hence excludes when the stored contents merely constitute signals or waves) rather than volatility of the storage media itself and hence includes both non-volatile memory (such as read-only memory (ROM)) as well as volatile memory (such as an erasable programmable read-only memory (EPROM)).) The control circuit 210 of the electronic device 120 is also electrically coupled via a connection 235 to an input/output 240 that can receive signals from and send signals (via a wired or wireless connection) to (e.g., commands, inventory database information) devices local to the retail sales facility 110, or one or more servers remote to the retail sales facility 110.

In the embodiment shown in FIG. 2, the control circuit 210 of the electronic device 120 is electrically coupled via a connection 245 to a user interface 250, which may include a visual display or display screen 260 (e.g., LED screen) and/or button input 270 that provide the user interface 250 with the ability to permit a user such as a stock room or sales floor associate at the retail sales facility 110 to manually control the inventory management electronic device 120 by inputting commands, for example, via touch-screen and/or button operation or voice commands. The display screen 260 can also permit the user to see various menus, options, and/or alerts displayed by the inventory management electronic device 120. The user interface 250 of the inventory management electronic device 120 may also include a speaker 280 that may provide audible feedback (e.g., alerts) to the user.

Figure 3:
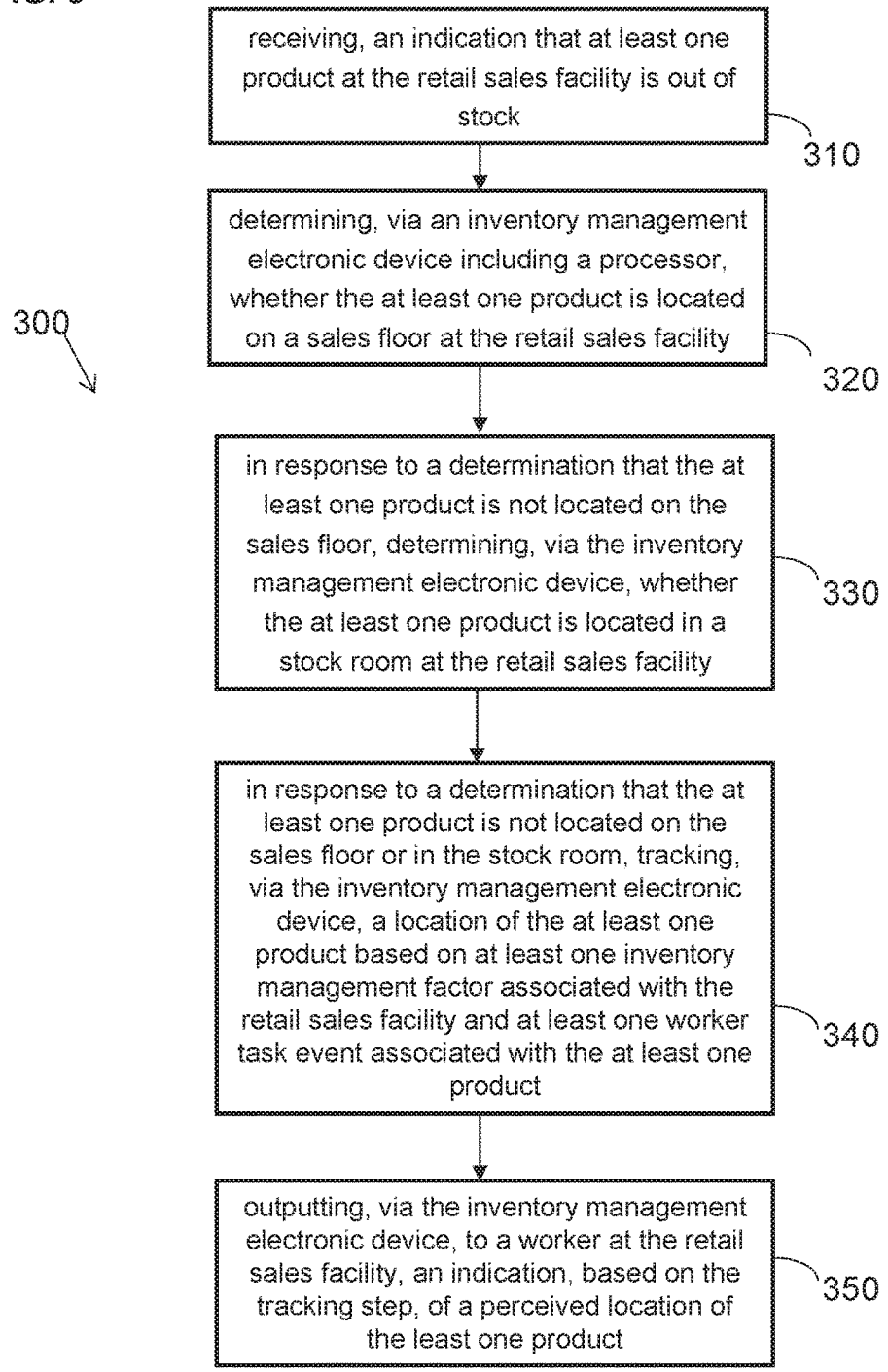
FIG. 3 is a flow chart diagram of a process of tracking out of stock items at a retail sales location in accordance with some embodiments.

With reference to FIGS. 1-3, one method 300 of operation of the system 100 to track and located out of stock products 90 at a retail sales facility 110 will now be described. For exemplary purposes, the method is described in the context of the system of FIG. 1, but it is understood that embodiments of the method may be implemented in this or other systems. Generally, as shown in FIG. 3, the method 300 includes receiving, an indication that a product 90 at the retail sales facility 110 is out of stock (step 310). Such an indication may be received as a result of a customer approaching a sales or stocking associate at the retail sales location 110 to inform the sales or stocking associate that the product 90 is not present on a shelf on the sales floor 180 where this product 90 is normally stocked. Alternatively, the consumer may inform the sales or stocking associate that the product 90 is out of stock after entering an SKU or an item identifier into an inventory management device available to consumers (e.g., by scanning a floor sample of the product 90 using an inventory management scanner) and receiving an indication that the product 90 is out of stock at the retail sales location 110. Alternatively, the out of stock indication may come as a result of a sales or stocking associate either scanning the floor sample of the product 90 or otherwise entering information identifying the product 90 into the inventory management database 140 (e.g., using the inventory management electronic device 120) and receiving an alert that the product 90 is out of stock.

In the embodiment shown in FIG. 3, the method 300 further includes determining whether the product 90 is located on a sales floor 180 at the retail sales facility 110 (step 320). This determination may be made as a result of the stocking associate at the retail sales facility 110 entering identifying information regarding the out of stock item 90 into the inventory management electronic device 120, in response to which the processor of the control circuit 210 of the inventory management electronic device 120 may be programmed to send an appropriate query or signal to the inventory management database 140 internal to the inventory management electronic device 120, or to a remote inventory management database via the input/output 240.

In one embodiment, the inventory management database 140, upon receiving such a query or signal including data identifying the item 90 can retrieve information regarding the current location of the item 90 at the retail sales facility 110, and more specifically, regarding whether the item 90 is presently located on a shelf on the sales floor 180 where the item 90 is normally stocked for display and sale to consumers. In some embodiments, if the information retrieved from the inventory management database 140 indicates that the item 90 is present on a shelf on the sales floor 180 of the retail sales facility 110, the processor of the control circuit 210 is programmed to send a signal to the display 260 and/or speaker 280 of the inventory management electronic device 120 to generate a visible alert (e.g., via the on-screen menu) or an audible alert (e.g., beep or voice command) to inform the user (e.g., stocking associate) that the item 90 is present on the shelf on the sales floor 180. It will be appreciated that instead of retrieving information related to the present location of the item 90 at the retail sales facility 110 from the inventory management database 140, such information may be retrieved by the inventory management electronic device 120 from an inventory management database remote to the retail sales facility 110.

In one embodiment shown in FIG. 3, in response to a determination by the processor of the control circuit 210 of the inventory management electronic device 120 that the product 90 is not located on the sales floor 180 at the retail sales facility 110, the processor of the control circuit 210 of the inventory management electronic device 120 is programmed to determine whether the product 90 is located in the stock room 170 at the retail sales facility 110 (step 330). As described above, this determination may be made as a result of the stocking associate at the retail sales facility 110 entering identifying information regarding the out of stock item 90 into the inventory management electronic device 120, in response to which the processor of the control circuit 210 of the inventory management electronic device 120 may be programmed to send an appropriate query or signal to the inventory management database 140, and the inventory management database 140, upon receiving such a query or signal including data identifying the item 90 can retrieve information regarding the current location of the item 90 at the retail sales facility 110, and more specifically, regarding whether the item 90 is presently located in the stock room 170. If the information retrieved from the inventory management database 140 indicates that the item 90 is in the stock room 170 of the retail sales facility 110, the processor of the control circuit 210 of the inventory management electronic device 120 may be programmed to send a signal to the display 260 or speaker 280 of the inventory management electronic device 120 to generate a visible alert (e.g., via the on-screen menu) or an audible alert (e.g., beep or voice command) to inform the user (e.g., stocking associate) that the item 90 is in the stock room 170.

In one embodiment shown in FIG. 3, in response to a determination by the processor of the control circuit 210 of the inventory management electronic device 120 that the product 90 is not located on the sales floor 180 or in the stock room 170 at the retail sales facility 110, the processor of the control circuit 210 of the inventory management electronic device 120 is programmed to track the location of the out of stock product 90 at the retail sales facility 110 based on at least one inventory management factor associated with the retail sales facility 110 and/or at least one worker task event associated with the product 90 (step 340). The inventory management factors and worker task events that the processor of the control circuit 210 of the inventory management electronic device 120 is programmed to analyze in tracking the location of the product 90 at the retail sales facility 110 are depicted in FIG. 4 and discussed in more detail below.

Based on the tracking analysis by the processor of the control circuit 210 of the inventory management electronic device 120, which will be described in more detail below, the processor of the control circuit 210 of the inventory management electronic device 120 is programmed to output an indication of a perceived or predicted location of the product 90 (step 350). The perceived location may be a physical location at the retail sales facility 110 such as the stock room 170, sales floor 180 or any other location at the retail sales facility 110 determined by the processor of the control circuit 210 of the inventory management electronic device 120 to contain the product 90. Alternatively, the output of the tracking analysis may be an indication that the product 90 is not present at the retail sales facility 110.

For example, based on the tracking analysis, the processor of the control circuit 210 of the inventory management electronic device 120 may be programmed to send signal to the display 260 or speaker 280 of the inventory management electronic device 120 to generate a visible alert (e.g., via the on-screen menu) or an audible alert (e.g., beep or voice command) to inform the user (e.g., stocking associate) that the item 90 is perceived to be in the stock room 170, on the sales floor 180, or not present at the retail sales facility 110. Such an alert would signal to the stocking associate to take appropriate action (e.g., retrieve the item 90 from the perceived location for the consumer) or inform the consumer seeking the item 90 at the retail sales facility 110 that the item 90 is not present at the retail sales facility 110.

In one embodiment, when the inventory management electronic device 120 indicates (e.g., via a visual or audible alert), based on tracking the item 90, to the stocking associate that the item 90 may be stocked on a shelf on the sales floor 180 or in the stock room 170, the inventory management electronic device 120 presents the associate with an option to acknowledge the alert, for example, by pressing on the display screen 260 or on one of the inputs 270 of the inventory management electronic device 120. When the stocking associate physically confirms whether the perceived location (i.e., based on the tracking analysis) of the item 90 is correct by walking to the perceived location and attempting to retrieve the item 90 and responds to the alert by indicating (e.g., via using the inputs 270 of the inventory management electronic device 120) whether the perceived location of the item 90 is correct or incorrect, the processor of the control circuit 210 of the inventory management electronic device 120 is programmed to designate the product 90 as being located in the location perceived based on the tracking analysis, or as being in an unidentified location at the retail sales facility 110, or as being not present at the retail sales facility 110.

For example, the processor of the control circuit 210 may be programmed to send a signal to the inventory management database 140 or, via the input/output 240, to an inventory management database on a remote server, to indicate the actual physical location of the item 90 at the retail sales facility 110. As such, the location of the item 90 at the retail sales facility 110 may be updated in the inventory management database 140 or remote inventory management database for the retail sales facility 110, which enables the inventory management database 140 and/or a remote database to systematically store updated information regarding the location of items 90 indicated to be out of stock at the retail sales facility 110 and to permit the associates to efficiently retrieve such items and provide them to consumers seeking to buy these items 90.

An exemplary method 400 of managing and stocking of products 90 at the retail sales facility 110 will now be described with reference to FIGS. 1 and 4. As shown generally in step 410, when a stocking associate wishes to identify the location of a product 90 indicated to the customer or the stocking associate to be out of stock (step 410), the inventory management electronic device 120 may be initially operated by the stocking associate to determine, as described above, whether the item 90 (indicated to be out of stock) is present in a primary location at the retail sales facility 110 (step 420). The primary location may be, for example, a shelf on the sales floor 180 at the retail sales facility 110 where the item 90 is normally offered for sale to the customers.

If the inventory management electronic device 120 indicates (e.g., via a displayed message, beep, or spoken words as discussed above) to the stocking associate that the item 90 is present in the primary location (step 425), the tracking process ends (step 430), enabling the stocking associate to physically check the primary location in an attempt to find the item 90 and provide it to the customer. Alternatively, if the inventory management electronic device 120 indicates (e.g., via a displayed message, beep, or spoken words as discussed above) to the stocking associate that the item 90 is not present in the primary location (step 435), the stocking associate may then operate the inventory management electronic device 120 to determine, as described above, whether the item 90 indicated to be out of stock is present in a secondary location at the retail sales facility 110 (step 440). The secondary location may be a location on the sales floor 180 other than the shelf where the item 90 is normally offered for sale to the customers, such as, for example, a feature, seasonal, or discount display on the sales floor 180. In yet another alternative, instead of relying on the inventory management electronic device 120 for a determination of whether the item 90 is present in the primary location, the stocking associate may walk to the primary location of the item 90 on the sales floor and visually inspect the primary location of the item 90 on the sales floor 180 to determine whether the item 90 indicated to be out of stock is present at the primary location. Upon the visual inspection, the stocking associate may then enter information into the inventory management system 100 using the inventory management electronic device 120 to indicate whether the item 90 is or is not present at the primary location at the retail sales facility 110.

If the inventory management electronic device 120 indicates (e.g., via a displayed message, beep, or spoken words as discussed above) to the stocking associate that the item 90 is present in the secondary location (step 445), the tracking process ends (step 450), enabling the stocking associate to physically check the secondary location in an attempt to find the item 90 and provide it to the customer. Alternatively, if the inventory management electronic device 120 indicates (e.g., via a displayed message, beep, or spoken words as discussed above) to the stocking associate that the item 90 is not present in the secondary location (step 455), the stocking associate may then operate the inventory management electronic device 120 to determine, as described above, whether the item 90 indicated to be out of stock is present in the back room or stock room 170 at the retail sales facility 110 (step 460).

If the inventory management electronic device 120 indicates (e.g., via a displayed message, beep, or spoken words as discussed above) to the stocking associate that the item 90 is present in the stock room 170 (step 465), the tracking process ends (step 470), enabling the stocking associate to physically check the stock room 170 in an attempt to find the item 90 and provide it to the customer. Alternatively, if the inventory management electronic device 120 indicates (e.g., via a displayed message, beep, or spoken words as discussed above) to the stocking associate that the item 90 is not present in the stock room 170 (step 475), the processor of the control circuit 210 of the inventory management electronic device 120 is programmed to track the location of the item 90 at the retail sales facility 110 using predetermined inventory management factors 480 associated with the retail sales facility 110, as shown in FIG. 4. It will be appreciated that the ten inventory management factors depicted in FIG. 4 are shown by way of example only, and the processor of the control circuit 210 of the inventory management electronic device 120 may be programmed to analyze any one or more of these inventory management factors (or additional inventory management factors) to determine a predicted location of an out of stock item 90 at the retail sales facility 110.

It will appreciated that the tracking of the out of stock items 90 at the retail sales facility 110 may be performed without requiring any calculation or analysis by the processor of the control circuit 210 of the inventory management electronic device 120, and that the system 100 may be configured such that the tracking of the out of stock items 90 may be performed by an inventory management computing device remote to the retail sales facility 110 and in communication with the inventory management electronic device 120. In such embodiments, the tracking analysis of the out of stock item 90 may be performed by the inventory management computing device remote to the grocery location 110 (based on data stored in the inventory management database 140 or a remote inventory management database), and may be stored at the remote inventory management database or in the inventory management database 140 until a time when a user uses the electronic computing device 120 to request and retrieve the perceived location of the out of stock item 90 from the remote inventory management database or the inventory management database 140, as appropriate.

With reference to FIG. 4, the exemplary inventory management factors that may be used for the tracking of the out of stock items 90 are: (1) mis-rings; (2) shipping error; (3) sales floor quantity versus shelf cap; (4) change in on-hand inventory at the retail sales facility; (5) bin accuracy; (6) perpetual inventory accuracy; (7) modular integrity; (8) shrink; (9) replenishment method; and (10) pick completion. Each factor is discussed in more detail below.

Factor 1, Mis-Rings, refers to the data stored in the inventory management database 140 indicating that a cashier at a cash register did not correctly scan an item 90 (or did not for some reason scan all of the items 90) during a sale or return of the item 90. In some embodiments, the processor of the control circuit 210 of the inventory management electronic device 120 is programmed to interpret a higher value of Mis-Rings at the retail sales facility 110 as representing a higher likelihood that the system-indicated location/status of the item 90 is incorrect, and that the item 90 may be out of stock and not present at the retail sales facility 110.

Factor 2, Shipping Error, refers to the data stored in the inventory management database 140 indicating that the number of items 90 indicated in shipping slips or in the system inventory database as being shipped to the retail sales facility 110 was incorrect. For example, a shipping error may be generated when the system indicates that 1000 items 90 were shipped to the retail sales facility 110 when in fact it was determined that only 980 or 990 items 90 were shipped to the retail sales facility 110. In some embodiments, the processor of the control circuit 210 of the inventory management electronic device 120 is programmed to interpret a higher value of Shipping Error at the retail sales facility 110 as representing a higher likelihood that the system-indicated location/status of the item 90 is incorrect, and that the item 90 may be out of stock and not present at the retail sales facility 110.

Factor 3, SF>SC (sales floor quantity greater than shelf cap), refers to the data stored in the inventory management database 140 indicating that the number of items 90 indicated to be on the sales floor 180 at the retail sales facility 110 is greater than the shelf space where the items 90 are typically stored. In some embodiments, the processor of the control circuit 210 of the inventory management electronic device 120 is programmed to interpret a higher number of SF>SC occurrences at the retail sales facility 110 as representing a higher likelihood that the system-indicated location of the item 90 as being out of stock is incorrect, and that the item 90 may be elsewhere on the sales floor 180 or in another area of the retail sales facility 110.

Factor 4, OH Delta (on-hand change), refers to the data stored in the inventory management database 140 indicating a change in the total number of items 90 in stock (i.e., on-hand) at the retail sales facility 110. In some embodiments, the processor of the control circuit 210 of the inventory management electronic device 120 is programmed to interpret a higher OH Delta value as representing a higher likelihood that the system-indicated location of the item 90 as being on the sales floor 180 of the retail sales facility 110 is incorrect, and that the item 90 is may be out of stock at the retail sales facility 110.

Factor 5, Bin Accuracy, refers to the data stored in the inventory management database 140 reflecting the accuracy of the systematic indication of the location of an item 90 by the stocking associates at the retail sales facility 110. For example, if the number of items 90 entered into the system as being present in a storage bin by a stocking associate corresponds to actual number of items 90 in the storage bin when physically checked, or when the system indicates that the item 90 is not present in a storage bin and the item 90 is actually not present in the storage bin when physically checked, the bin accuracy value would be high for the retail sales facility 110, and vice versa. In some embodiments, the processor of the control circuit 210 of the inventory management electronic device 120 is programmed to interpret a lower Bin Accuracy value as representing a higher likelihood that the system-indicated location and status of the item 90 at the retail sales facility 110 is incorrect and vice versa.

Factor 6, PI Accuracy (or perpetual accuracy), refers to the data stored in the inventory management database 140 reflecting the accuracy of the inventory location designation by the stocking associates at the retail sales facility 110. This factor generally indicates whether the items 90 are generally located where the system indicates they are located. In some embodiments, the processor of the control circuit 210 of the inventory management electronic device 120 is programmed to interpret a lower PI Accuracy value as representing a higher likelihood that the system-indicated location and status of the item 90 at the retail sales facility 110 is incorrect and vice versa.

Factor 7, Mod Integrity (or modular planogram integrity), refers to the data stored in the inventory management database 140 indicating how correctly the stocking associates at the retail sales facility 110 stock the shelf on the sales floor 180 with the items 90 and/or how correctly the shelf on the sales floor 180 is set up for the items 90. This factor generally indicates whether the actual layout of the items 90 on the sales floor of the retail sales facility 110 corresponds to the layout of the items 90 according to the inventory management system 10. In some embodiments, the processor of the control circuit 210 of the inventory management electronic device 120 is programmed to interpret a lower PI Accuracy value as representing a higher likelihood that the system-indicated location and status of the item 90 at the retail sales facility 110 is incorrect and vice versa.

Factor 8, shrink, indicates how often items 90 go missing or unaccounted for at the retail sales facility 110 (e.g., as a result of theft, supplier mistakes, or other paperwork errors). In some embodiments, the processor of the control circuit 210 of the inventory management electronic device 120 is programmed to interpret a higher shrink value as representing a higher likelihood that the item 90 is not present at the retail sales facility 110 and vice versa.

Factor 9, Replen Method (or replenishment method) indicates whether the item 90 moves quickly or slowly and is replenished quickly or slowly at the retail sales facility 110. The replenishment method may be indicated as a high velocity distribution center (HVDC) or a regional distribution center (RDC). If the replenishment method is indicated as HVDC, the item 90 is replenished quickly and has high turnover, while an RDC replenishment method is indicative of items 90 that have low turnover and move slowly. Accordingly, in some embodiments, the processor of the control circuit 210 of the inventory management electronic device 120 is programmed to interpret an HVDC replenishment method as generally indicating a higher likelihood that the system-indicated location or status of the item 90 at the retail sales facility 110 is incorrect, and to interpret the RDC replenishment method as generally indicating a higher likelihood that the system-indicated location or status of the item 90 at the retail sales facility 110 is correct.

Factor 10, Pick Completion, indicates how often when the system indicates to an associate to pick an item 90 (e.g., from a storage bin) that the associate actually completes the pick. For instance, a low pick completion percentage may indicate that a stocking associate is not operating efficiently but likely honestly; an average pick completion may indicate that a stocking associate is operating within the norm of expected efficiency and honesty; a high pick completion may indicate that an associate may be entering into the system that the associate picked an item while the associate is not physically picking the item. Thus, in some embodiments, the processor of the control circuit 210 of the inventory management electronic device 120 is programmed to interpret a high pick completion percentage at the retail sales facility 110 as indicative of a higher likelihood that the system-indicated location or status of the item 90 at the retail sales facility 110 is incorrect.

In the exemplary embodiment illustrated in FIG. 4, in addition to the ten exemplary inventory management factors discussed above based on which a perceived location of the out of stock item 90 may be tracked at the retail sales facility 110, the processor of the control circuit 210 of the inventory management electronic device 120 may be programmed to track the location of the item 90 at the retail sales facility 110 using predetermined worker task events 490 associated with the product 90. It will be appreciated that the nine worker task events 490 depicted in FIG. 4 are shown by way of example only, and any one or more of these worker task events 490 (or additional worker task events) may be analyzed by the processor of the control circuit 210 of the inventory management electronic device 120 to determine a perceived location of an out of stock item 90 at the retail sales facility 110.

The exemplary worker task events are identified in FIG. 4 by numbers that continue the numbering from the last inventory management factor and are as follows: (11) time stamp of last sale of the item 90 to a customer; (12) time stamp of last customer return of the item 90; (13) time stamp of last customer claim for the item 90 (i.e., product indicated as not sellable); (14) time stamp of last binning or unbinning of the item 90; (15) time stamp of last feature set or unset of the item 90 (i.e., product is displayed as a featured item on the sales floor 180); (16) time stamp of last delivery of the item 90; (17) time stamp of last scan of the item 90; (18) time stamp of last price change of the item 90; and (19) time stamp of pick of the item 90.

In one embodiment, the processor of the control circuit 210 of the inventory management electronic device 120 is programmed to track the location of the item 90 at the retail sales facility 110 using the inventory management factors 480 and the worker task events 490 described above and output a perceived location of the item 90 at the retail sales facility 110 based on the tracking analysis. Some exemplary output of the processor of the control circuit 210 of the inventory management electronic device 120 based on the above-discussed inventory management factors (F1, F2, F3, etc.) and worker task events (T11, T12, T13, etc.) are discussed below. It will be appreciated that output of the processor of the control circuit 210 of the inventory management electronic device 120 regarding the perceived location of an out of stock item 90 at the retail sales facility 110 may be based on many different combinations of one or more of the above-discussed inventory management factors 480 and/or worker task events 490, or may be based on combinations including additional inventory management factors 480 and additional worker task events 490 suitable for tracking a location of the out of stock item 90 at the retail sales facility 110.

For example, the processor of the control circuit 210 of the inventory management electronic device 120 may be programmed to output that the item 90 is not present (i.e., out of stock) at the retail sales facility 110 if at least one of the following eight conditions is met during the tracking analysis: (1) if bin accuracy (F5) or perpetual accuracy (F6) or modular planogram integrity (F7) or pick completion percentage (F10) are low, and shrink (F8) or shipping error (F2) or mis-rings (F1) are high; (2) if time stamp of last delivery (T16) is newest and then the time stamp of last sale (T11) is newest, and on-hand delta (F4) is low; (3) if shrink (F8) is high; (4) if time stamp of last scan is newest (T17), and then timestamp of last sale is newest (T11), and then time stamp of last delivery (T16) is newest; (5) if the replenishment method (F9) is RDC assembly; (6) if on-hand delta (F4) is high and/or perpetual accuracy (F6) is low; (7) if time stamp of last price change newest (T18) and on-hand delta (F4) is high and/or perpetual accuracy (F6) is low; and (8) if the answer is "no" on all worker task events. Some other exemplary outputs of the control circuit 210 of the inventory management electronic device 120 and the inventory management factors 480 and worker task events 490 contributing to such outputs are described below.

If SF>SC (F3) and time stamp of last delivery is newest (T16), and then time stamp of last pick is newest (T19), or time stamp of last sale is newest (T11), or time stamp of last claim is newest (T13), or time stamp of last bin or unbin is newest (T14), or time stamp of last return is newest (T12), or time stamp of last scan is newest (T17), then the processor of the control circuit 210 of the inventory management electronic device 120 is programmed to output an indication to a stocking associate to look for the item 90 in the unworked freight.

If the replenishment method (F9) is determined to be HVDC, then the processor of the control circuit 210 of the inventory management electronic device 120 is programmed to output an indication to a stocking associate to look for the item 90 in unbinned locations or previous binned area of the retail sales facility 110.

If the time stamp of last claim is newest (T13), then the processor of the control circuit 210 of the inventory management electronic device 120 is programmed to output an indication to a stocking associate to look for the item 90 in the claims area of the retail sales facility 110.

If the time stamp of last return is newest (T12), then the processor of the control circuit 210 of the inventory management electronic device 120 is programmed to output an indication to a stocking associate to look for the item 90 in the claims or returns area of the retail sales facility 110.

If the time stamp of last pick is newest (T19) and pick completion (F10) is high, then the processor of the control circuit 210 of the inventory management electronic device 120 is programmed to output an indication to a stocking associate to look for the item 90 in the pick carts in the stock room 170 of the retail sales facility 110.

If modular planogram integrity (F7) is low, then the processor of the control circuit 210 of the inventory management electronic device 120 is programmed to output an indication to a stocking associate to look for the item 90 in an area near the primary location on the sales floor 180 of the retail sales facility 110.

If the time stamp of last pick is newest (T19) and pick completion (F10) or bin accuracy (F5) are low, then the processor of the control circuit 210 of the inventory management electronic device 120 is programmed to output an indication to a stocking associate to look for the item 90 in the bin where the item 90 was indicated to be previously stored at the retail sales facility 110.

If the time stamp of last bin or unbin is newest (T14) and pick completion (F10) or bin accuracy (F5) are low, then the processor of the control circuit 210 of the inventory management electronic device 120 is programmed to output an indication to a stocking associate to look for the item 90 in the bin where the item 90 was indicated to be previously stored at the retail sales facility 110.

If the time stamp of last feature set newest (T15), then the processor of the control circuit 210 of the inventory management electronic device 120 is programmed to output an indication to a stocking associate to look for the item 90 in feature locations on the sales floor 180 or unbinned in the stock room 170 of the retail sales facility 110.

In one approach, the processor of the control circuit 210 of the inventory management device 120 is programmed to monitor whether one or more worker task events 490 entered into the inventory management database 140 as being completed was in fact physically completed. Based on this monitoring, the processor of the control circuit 210 of the inventory management device 120 is programmed to generate in the inventory management database 140 at least one data point indicating whether the one or more worker task event entered into the inventory management database 140 as being completed was physically completed. In addition, the processor of the control circuit 210 of the inventory management device 120 is programmed to generate a report including at least one data point over a predetermined period of the monitoring. The processor of the control circuit 210 of the inventory management device 120 is programmed to use such data points to generate an alert for items 90 for which a worker task was entered into the inventory management database 140 as being completed but was in fact not completed. In addition, such data points can be used to determine a metric for the quality of stocking work by the inventory management associates at the retail sales facility 110.

As described herein, the system and methods described herein provide for easy and efficient tracking and retrieval of out of stock inventory at a retail sales facility. As discussed above, in a response to an indication that an item is out of stock at the retail sales facility, the methods and systems described herein can track the location of the out of stock item using one or more inventory management factors and worker task events described above and output an accurate perceived location of the item at the retail sales facility based on the tracking analysis. This advantageously improves the efficiency of associates in determining whether items indicated to be out of stock are present at the retail sales facility, and if so, facilitates the stocking associates in tracking down and retrieving the items sought by the consumers and providing the retrieved items to the consumers.

Those skilled in the art will recognize that a wide variety of other modifications, alterations, and combinations can also be made with respect to the above described embodiments without departing from the scope of the invention, and that such modifications, alterations, and combinations are to be viewed as being within the ambit of the inventive concept.

What is claimed is:

1. A method for assisting in the locating of out of stock products at a retail sales facility, the method comprising:
    providing an inventory management database storing electronic data indicating at least one product that is offered for sale to consumers at a display location on a sales floor of the retail sales facility;
    receiving, an indication that at least one product is out of stock on the sales floor of the retail sales facility;
    determining, via an inventory management electronic device including a processor, and in response to querying the inventory management database via the inventory management electronic device to obtain inventory management data associated with the at least one product, that the inventory management data obtained via the inventory management electronic device from the inventory management database indicates that the at least one product is not located at the display location on the sales floor of the retail sales facility and is not located in a stock room of the retail sales facility;
    tracking, via the inventory management electronic device and the inventory management database, a location of the at least one product at the retail sales facility other than the display location and other than the stock room, based on analyzing, via the inventory management electronic device, at least one inventory management factor associated with the retail sales facility and at least one worker task event associated with the at least one product, the at least one management factor and the worker task event being stored in the inventory management database; and
    outputting, based on the tracking step and via the inventory management electronic device, an indication of a predicted location of the least one product at the retail sales facility other than the display location and other than the stock room, to a worker at the retail sales facility;
    wherein the at least one inventory management factor includes at least one of: mis-rings, shipping error, sales floor quantity versus shelf cap, change in on-hand inventory at the retail sales facility, bin accuracy, perpetual inventory accuracy, modular integrity, shrink, replenishment method, and pick completion; and
    wherein the at least one worker task event includes at least one of: time stamp of last sale of the at least one product, time stamp of last customer return of the at least one product, time stamp of last customer claim for the at least one product, time stamp of last binning or unbinning of the at least one product, time stamp of last feature set or unset of the at least one product, time stamp of last delivery of the at least one product, time stamp of last scan of the at least one product, time stamp of last price change of the at least one product, and time stamp of pick of the at least one product.

2. The method of claim 1, wherein the receiving step includes inputting identifying information for the at least one product into the inventory management database and receiving a signal from the inventory database indicating that the at least one product is out of stock at the retail sales facility.

3. The method of claim 2, wherein the display location is a shelf on the sales floor of the retail sales facility where the at least one product is regularly offered for sale.

4. The method of claim 1, wherein the tracking step is performed via a control circuit including the processor in communication with the at least one inventory management database.

5. The method of claim 1, further comprising monitoring, via the inventory management electronic device, whether the at least one worker task event entered into the inventory management database as being completed was physically completed, generating in the inventory management database at least one data point indicating whether the at least one worker task event entered into the inventory management database as being completed was physically completed, and generating, via the inventory management electronic device, a report including the at least one data point over a predetermined period of the monitoring.

6. The method of claim 1, wherein the outputting step further comprises indicating, via the inventory management electronic device, to the user, based on the tracking step, to look for the at least one product in a location at the retail sales facility including at least one of: truck unload area, to be stocked area, unworked freight area, unbinned area, returns area, claims area, pick cart in stock room, area near shelf on the sales floor of the retail sales facility, last known bin location, and feature product display.

7. The method of claim 1, wherein the outputting step further comprises indicating, via the inventory management electronic device, to the worker and based on the tracking step, that the at least one product is not present on hand at the retail sales facility.

8. A system for tracking out of stock products at a retail sales facility, the system comprising:
at least one inventory management database storing electronic data indicating at least one product that is offered for sale to consumers at a display location on a sales floor of at the retail sales facility; and
a control circuit including a processor in communication with the at least one inventory management database, the control circuit configured to:
receive electronic data from the at least one inventory management database that indicates that the at least one product is not located at the display location on the sales floor of the retail sales facility y and is not located in a stock room of the retail sales facility;
track a location of the at least one product at the retail sales facility other than the display location and other than the stock room of the retail sales facility, based on an analysis, by the control circuit, of at least one inventory management factor associated with the retail sales facility and at least one worker task event associated with the at least one product, the at least one management factor and the worker task event being stored in the inventory management database; and
output to a worker at the retail sales facility, based on the tracked location of the at least one product, an indication of a predicted location of the least one product at the retail sales facility other than the display location and other than the stock room of the retail sales facility;
wherein the at least one inventory management factor includes at least one of: mis-rings, shipping error, sales floor quantity versus shelf cap, change in on-hand inventory at the retail sales facility, bin accuracy, perpetual inventory accuracy, modular integrity, shrink, replenishment method, and pick completion; and
wherein the at least one worker task event includes at least one of: time stamp of last sale of the at least one product, time stamp of last customer return of the at least one product, time stamp of last customer claim for the at least one product, time stamp of last binning or unbinning of the at least one product, time stamp of last feature set or unset of the at least one product, time stamp of last delivery of the at least one product, time stamp of last scan of the at least one product, time stamp of last price change of the at least one product, and time stamp of pick of the at least one product.

9. The system of claim 8, wherein the control circuit is configured to send a signal including identifying information for the at least one product to the at least one inventory management database and receive a signal from the inventory database indicating that the at least one product is out of stock at the retail sales facility.

10. The system of claim 9, wherein the display location is a shelf on the sales floor of the retail sales facility where the at least one product is regularly offered for sale.

11. The system of claim 8, wherein the control circuit is configured to:
monitor whether the at least one worker task event entered into the at least one inventory management database as being completed was physically completed;
generate in the at least one inventory management database at least one data point indicating whether the at least one worker task event entered into the at least one inventory management database as being completed was physically completed; and
generate a report including the at least one data point over a predetermined period of monitoring by the server.

12. The system of claim 8, wherein the control circuit is configured to indicate to the user, based on the tracked location of the at least one product, to look for the at least one product at a location at the retail sales facility including at least one of: truck unload area, to be stocked area, unworked freight area, unbinned area, returns area, claims area, pick cart in stock room, area near shelf on the sales floor of the retail sales facility, last known bin location, and feature item display.

13. The system of claim 8, wherein the control circuit is configured to indicate to the worker, based on the tracked location of the at least one product, that the at least one product is not present at the retail sales facility.

14. A system for tracking out of stock items at a retail sales facility, the system comprising:
at least one storage means storing electronic data indicating at least one product that is offered for sale to consumers at a display location on a sales floor of at the retail sales facility; and
a control means including a processor in communication with the at least one inventory management database, the control means configured to:
receive electronic data from the at least one storage means that indicates that the at least one product is not located at the display location on the sales floor of the retail sales facility and is not located in a stock room of the retail sales facility;
track a location of the at least one product at the retail sales facility other than the display location and other than the stock room of the retail sales facility based on at least one inventory management factor associated with the retail sales facility and at least one worker task event associated with the at least one product, the at least one management factor and the worker task event being stored in the storage means; and
output to a worker at the retail sales facility, based on the tracked location of the at least one product, an indication of a predicted location of the least one product at the retail sales facility other than the display location and other than the stock room of the retail sales facility;
wherein the at least one inventory management factor includes at least one of: mis-rings, shipping error, sales floor quantity versus shelf cap, change in on-hand inventory at the retail sales facility, bin accuracy, perpetual inventory accuracy, modular integrity, shrink, replenishment method, and pick completion; and
wherein the at least one worker task event includes at least one of: time stamp of last sale of the at least one product, time stamp of last customer return of the at least one product, time stamp of last customer claim for the at least one product, time stamp of last binning or unbinning of the at least one product, time stamp of last feature set or unset of the at least one product, time stamp of last delivery of the at least one product, time stamp of last scan of the at least one product, time stamp of last price change of the at least one product, and time stamp of pick of the at least one product.

* * * * *